(12) United States Patent
Genise et al.

(10) Patent No.: US 8,813,593 B2
(45) Date of Patent: Aug. 26, 2014

(54) ADAPTER FOR CONNECTING A COUNTERSHAFT TRANSMISSION WITH A HYDRAULIC LAUNCH ASSIST SYSTEM

(75) Inventors: Thomas A. Genise, Dearborn, MI (US); Mihai Dorobantu, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 209 days.

(21) Appl. No.: 12/943,044

(22) Filed: Nov. 10, 2010

(65) Prior Publication Data

US 2011/0126652 A1    Jun. 2, 2011

Related U.S. Application Data

(60) Provisional application No. 61/264,987, filed on Nov. 30, 2009.

(51) Int. Cl.
| | |
|---|---|
| *F16H 3/08* | (2006.01) |
| *B60W 30/18* | (2012.01) |
| *B60K 6/387* | (2007.10) |
| *B60K 6/36* | (2007.10) |
| *B60K 6/40* | (2007.10) |
| *B60K 6/12* | (2006.01) |
| *B60K 6/48* | (2007.10) |

(52) U.S. Cl.
CPC ............ *B60K 6/12* (2013.01); *B60W 30/18027* (2013.01); *B60K 6/387* (2013.01); *Y02T 10/6221* (2013.01); *B60K 6/36* (2013.01); *Y02T 10/6282* (2013.01); *Y02T 10/6208* (2013.01); *B60K 6/40* (2013.01); *B60K 6/48* (2013.01)
USPC ............................................. 74/329; 74/333

(58) Field of Classification Search
USPC ................... 74/329, 331, 333, 339, 359, 325
See application file for complete search history.

(56) References Cited

U.S. PATENT DOCUMENTS

| | | | |
|---|---|---|---|
| 4,267,741 A * | 5/1981 | Jarl et al. ......................... | 74/339 |
| 6,159,127 A | 12/2000 | Loeffler et al. | |
| 6,491,599 B1 * | 12/2002 | Schmidt ............................ | 475/5 |
| 6,640,917 B2 | 11/2003 | Maruyama | |
| 6,729,198 B2 * | 5/2004 | Brandt ............................ | 74/337 |
| 6,945,893 B2 | 9/2005 | Grillo | |
| 7,165,470 B2 * | 1/2007 | Sakamoto et al. .............. | 74/339 |
| 7,185,722 B1 * | 3/2007 | Sakamoto et al. ......... | 180/65.25 |
| 7,214,156 B2 * | 5/2007 | Oliver ............................... | 475/8 |
| 7,540,823 B2 | 6/2009 | Kilian et al. | |
| 8,257,213 B2 * | 9/2012 | Komada et al. ................... | 475/5 |
| 2005/0050974 A1 * | 3/2005 | Ibamoto et al. ................. | 74/333 |
| 2006/0048593 A1 * | 3/2006 | Gumpoltsberger et al. .... | 74/325 |
| 2007/0029119 A1 * | 2/2007 | Syed et al. .................... | 180/65.2 |
| 2007/0151781 A1 * | 7/2007 | Kuang et al. ................ | 180/65.1 |
| 2007/0251345 A1 * | 11/2007 | Kriebernegg et al. .......... | 74/335 |
| 2008/0127758 A1 * | 6/2008 | Gitt ................................ | 74/329 |
| 2008/0190228 A1 * | 8/2008 | Long et al. ...................... | 74/331 |
| 2008/0245168 A1 * | 10/2008 | Heinzelmann ................. | 74/335 |
| 2011/0126652 A1 * | 6/2011 | Genise et al. ................... | 74/329 |

* cited by examiner

*Primary Examiner* — Troy Chambers
*Assistant Examiner* — Alexandre Vu
(74) *Attorney, Agent, or Firm* — Kevin M. Hinman

(57) ABSTRACT

This invention provides a common means of coupling an alternative power source to a vehicle's drive wheels which is particularly well suited for use with a countershaft-type transmission. This invention also addresses clutch wear by eliminating the need to engage the frictional clutch to launch the vehicle. This invention also improves the acceleration of the vehicle compared to a typical dry friction clutch launch by relying on the HLA system to transfer more power to the drive wheels more quickly than would be transferred by a typical launch engagement of a dry friction clutch in a commercial vehicle.

3 Claims, 8 Drawing Sheets

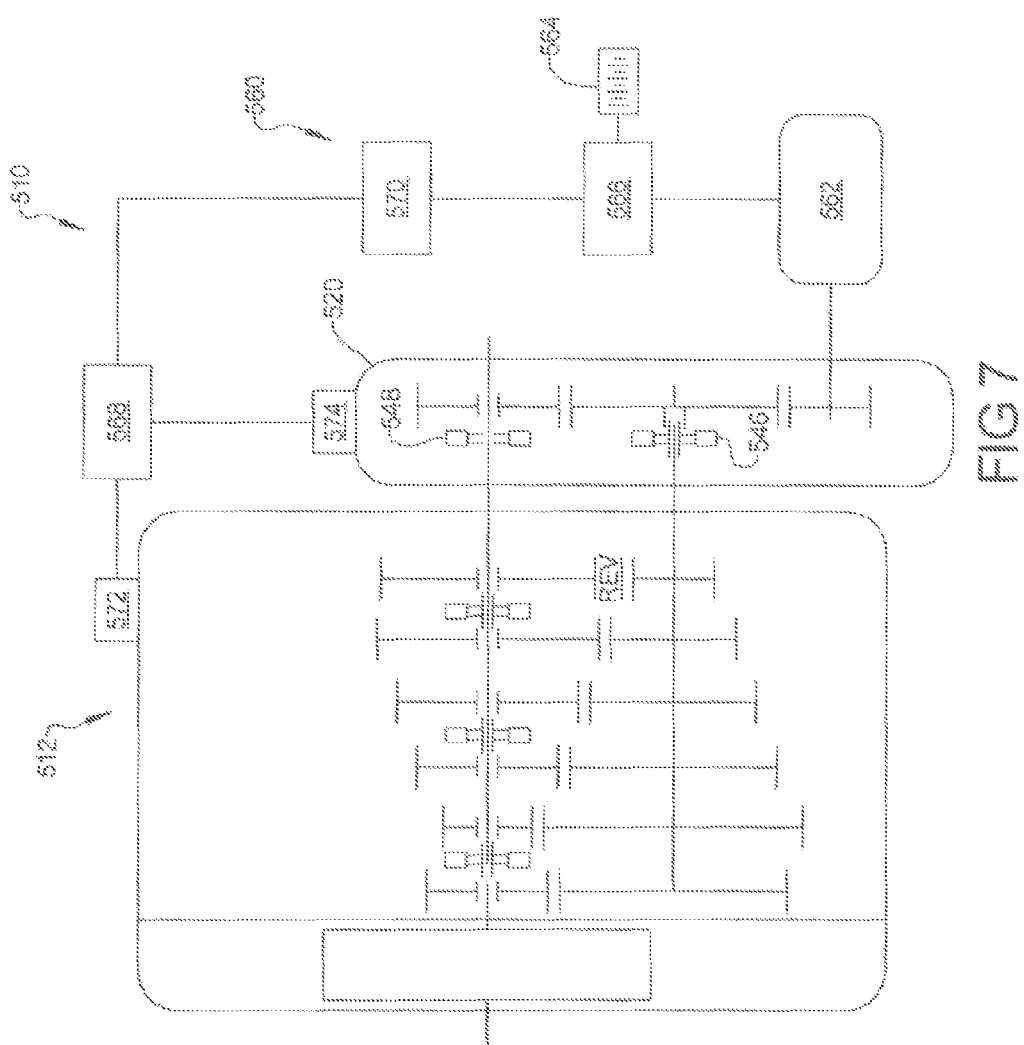

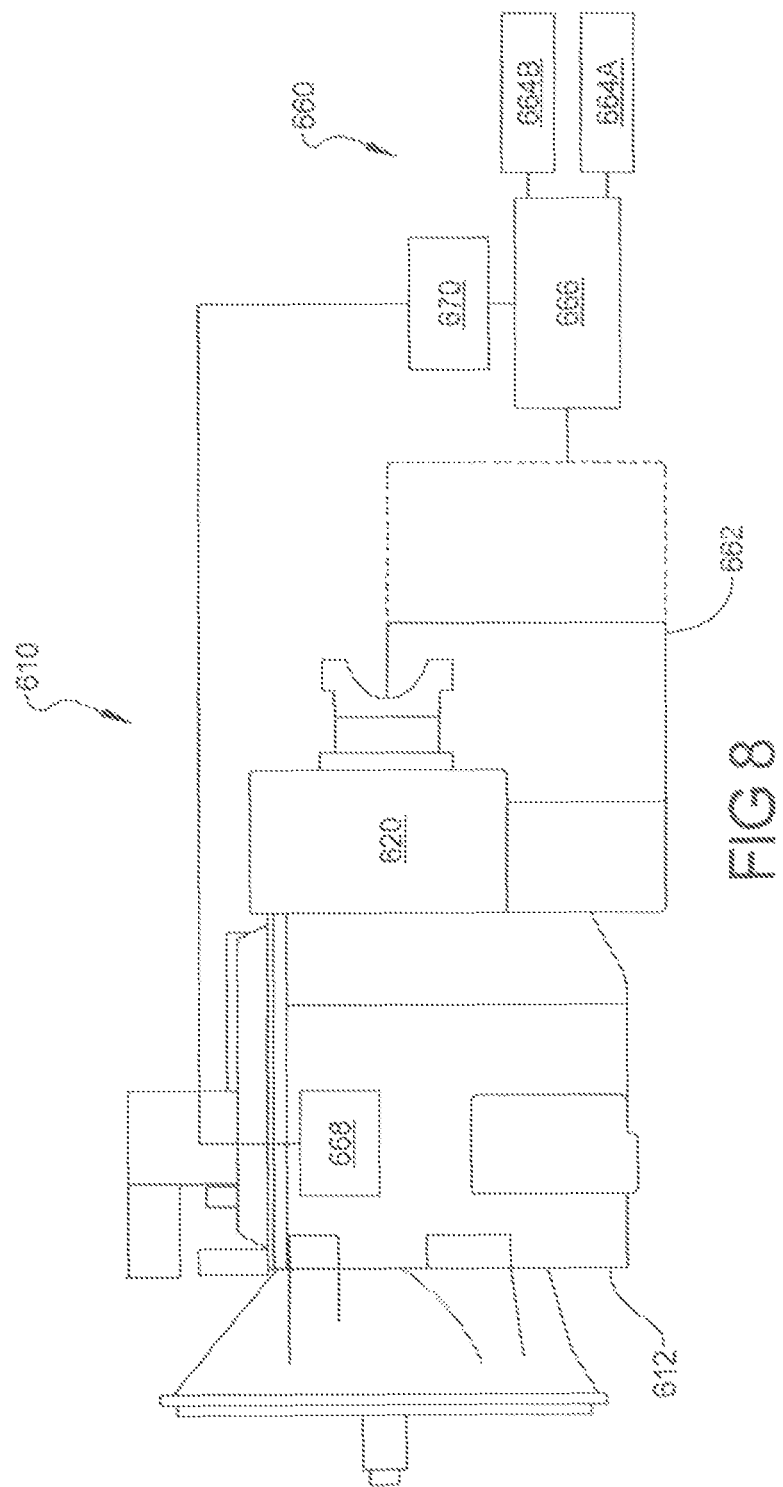

US 8,813,593 B2

ADAPTER FOR CONNECTING A COUNTERSHAFT TRANSMISSION WITH A HYDRAULIC LAUNCH ASSIST SYSTEM

CROSS-REFERENCE TO RELATED APPLICATIONS

This application claims the benefit of U.S. Provisional Application No. 61/264,987, filed Nov. 30, 2009, which is hereby incorporated by reference in its entirety.

BACKGROUND OF THE INVENTION

Known hybrid vehicle drive systems coupling an internal combustion engine and an alternative power source such as an electric motor or a hydraulic motor require means of linking the alternative power source and the internal combustion engine to the drive wheels. Each configuration may have a preferred configuration, but such configuration can vary with vehicle use and application.

One known electric hybrid system, of the general type described in U.S. Pat. No. 7,463,962, has an electric motor coupled to a transmission input shaft. This configuration was well suited for use with a transmission having a countershaft powerflow configuration. However, by placing the motor in line with the engine and transmission, increasing the size of the electric motor requires making many significant changes to the associated driveline components and mounting features at great expense. It is desired to have an arrangement which permits greater flexibility in changing the size of the electric motor or electric motor/generator, and which is also well suited to a countershaft transmission. Countershaft transmissions are also known as mechanical or manual transmissions, in part because countershaft transmissions have been shifted manually by the vehicle operator. Automated countershaft transmissions are known as automated mechanical transmissions or AMTs.

One hydraulic hybrid system, known as a hydraulic launch assist (HLA) system, has been adapted for commercial vehicles and increases fuel economy and acceleration compared to vehicles not so equipped, particularly when used in application having frequent starting and stopping and low-speed operation, such as city buses and refuse collection trucks. However, HLA systems are typically used in combination with conventional automatic transmissions employing a torque converter to communicate driving torque from an engine to the transmission. The torque converter facilitates starting the vehicle from a stopped condition without the need to gradually engage a clutch, and the torque converter also provides torque multiplication when there is a significant speed ratio across the torque converter. At low speed operation, the torque converter losses are a much more significant portion of the power from the engine. A countershaft transmission, and more particularly an automated mechanical transmission (AMT) equipped with a plate clutch for transmitting torque, is significantly more efficient at low speed and start-stop operation than a torque converter transmission, and weighs less than a torque converter transmission. However, typical dry friction clutch plates or driven discs wear out undesirably quickly under such operating conditions. Additionally, the rate of acceleration when starting from a stop is typically less for an AMT equipped vehicle than a torque converter/automatic transmission equipped vehicle in part because of the torque multiplication benefit conferred by a torque converter. It is desired to have an arrangement which permits the coupling of an HLA system with a countershaft transmission and reduces the driven disc wear concern and improves the acceleration of the system over the acceleration provided by an AMT with a dry friction clutch.

SUMMARY OF THE INVENTION

This invention provides a common means of coupling an alternative power source to a vehicle's drive wheels which is particularly well suited for use with a countershaft-type transmission.

This invention also overcomes the clutch wear concern by eliminating the need to engage the frictional clutch to launch the vehicle. This invention also improves the acceleration of the vehicle compared to a typical dry friction clutch launch by relying on the HLA system to transfer more power to the drive wheels more quickly than would be transferred by a typical launch engagement of a dry friction clutch in a commercial vehicle.

DESCRIPTION OF DRAWINGS

FIG. 7 is a schematic view of a fifth alternative embodiment of the invention.
FIG. 8 is a schematic view of a sixth alternative embodiment of the invention.

DETAILED DESCRIPTION OF THE INVENTION

Figure 1:
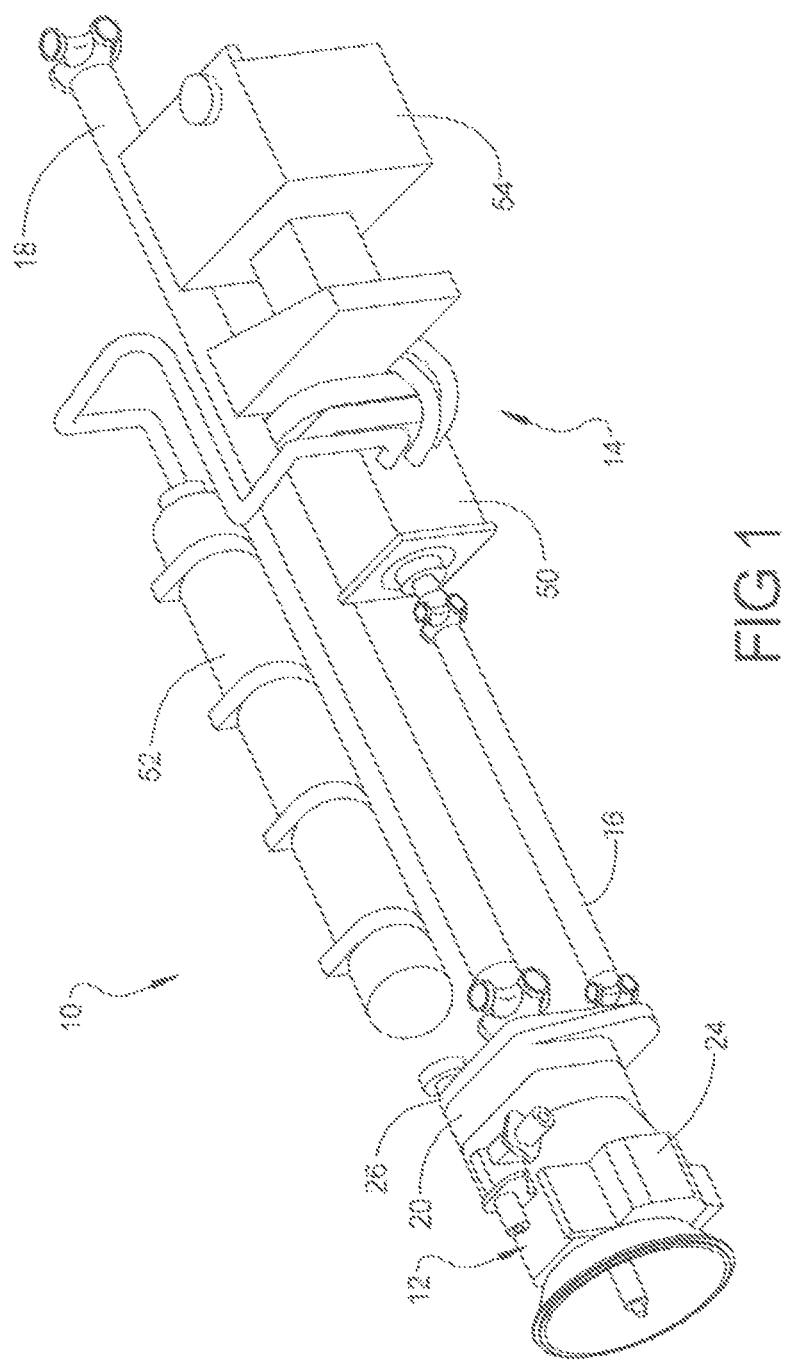
FIG. 1 is a perspective view of a drivetrain combining an automated mechanical transmission AMT and an HLA.

FIG. 1 shows a drivetrain 10 including an automated mechanical transmission (AMT) 12 connected to a hydraulic launch assist system (HLA system) 14 by an intermediate propeller shaft 16. Another propeller shaft, referred to hereafter as a driveshaft 18, is connected to transmission 12 on one end and for connection to an axle (not shown) on the other end. An adapter module 20 is incorporated into transmission 12 to connect HLA system 14 to drivetrain. Adapter module 20 beneficially eliminates the need for a transfer case which was disposed between the transmission and the HLA system in prior art systems. Adapter module 20 provides much of the functionality of a transfer case with much less hardware. A master clutch 22 provides a selectively engaged driving connection between a vehicle drive engine (not shown) and AMT 12.

Figure 2:
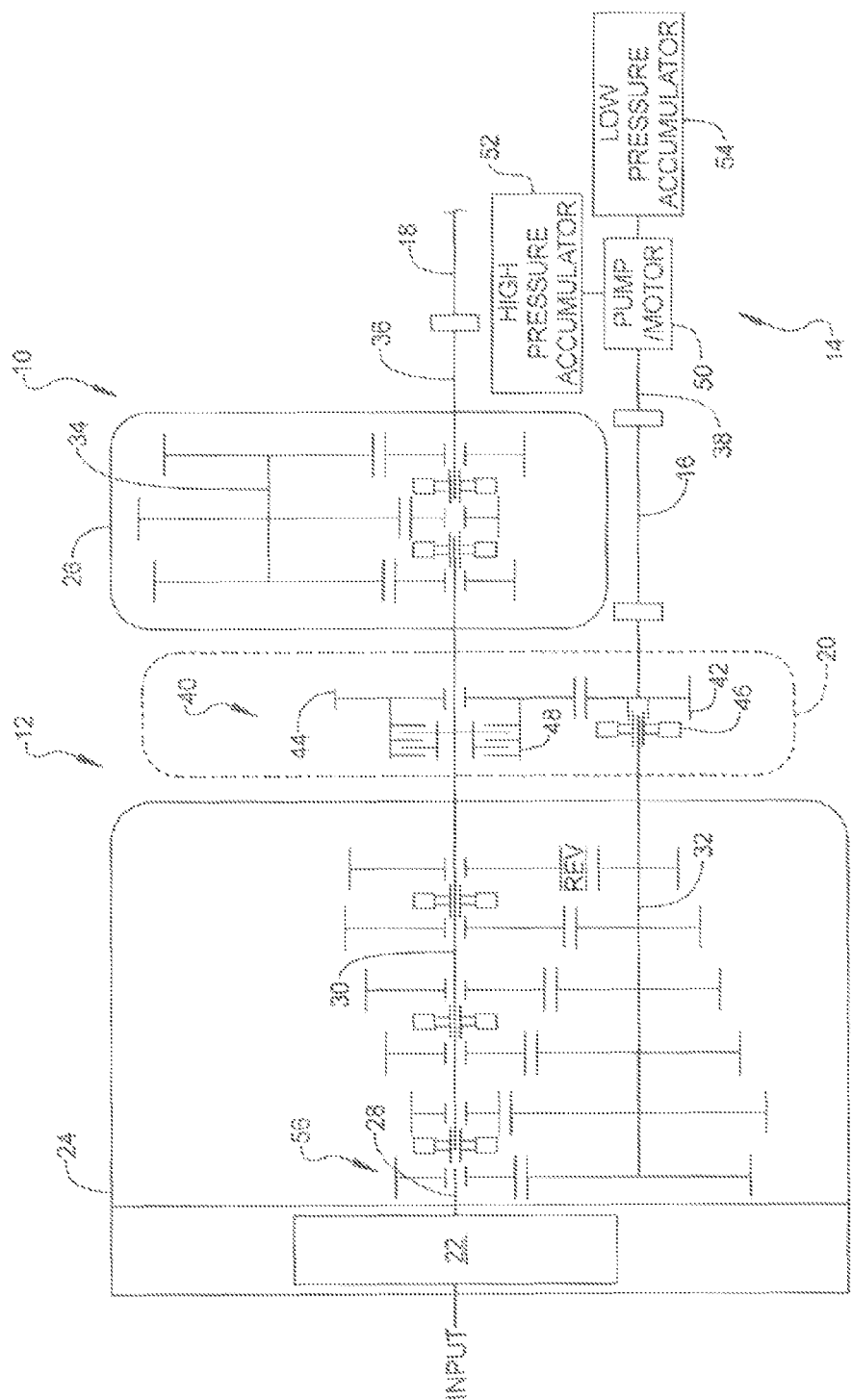
FIG. 2 is a schematic view of the drivetrain of FIG. 1.

FIG. 2 shows schematically one configuration of the drivetrain of FIG. 1. Adapter module 20 is disposed between front box 24 and auxiliary section 26. The invention is not intended to be limited by the configuration of the transmission shown, except to extent the transmission employs an input shaft, an output shaft and a countershaft. Front box 24 has an input shaft 28, an output shaft 30 and a countershaft 32. Front box 24, by way of example only, provides four selectable forward drive gear ratios and one reverse gear drive ratio. A headset of meshed gears provides driving engagement between input shaft 28 and countershaft 32. Gears on output shaft 30 are in mesh with gears on countershaft 32. Slideable dog clutches are used to fix the gears to the shaft on which they are disposed to achieve the targeted gear ratio.

Auxiliary section 26, in the exemplary embodiment a range box, is coupled to front box 24 by output shaft 30, providing up to an additional four ratios for each forward gear ratio. The number of ratios available in each section is not critical to the invention. Auxiliary section 26 has a countershaft 34 and an output shaft 36. Intermediate propeller shaft 16 passes adjacent to rather than through range box 26.

Adapter module 20 has a mechanism for transmitting torque between transmission output shaft 30 and an HLA system input shaft 38. The mechanism takes the form of an adapter gear set 40 with meshed first and second gears 42 and 44 respectively. It should be appreciated that any known fixed-ratio means for transferring speed and torque between parallel shafts can be employed in place of gear set 40, such as more complicated gear sets, or a sprocket and chain combination, potentially in combination with other fixed ratio mechanisms.

First gear 42 is drivingly connected to input shaft 38 of HLA system 14. First gear 42 is shown as mounted directly to shaft 38, but could alternatively be on a separate shaft and drivingly connected by a gear set, drive chain and sprocket combination, or any other mechanism known in the art. Such an intermediate element could provide a speed differential of a fixed ratio between countershaft 32 and the HLA input shaft 38.

Second gear 44 is shown as being rotatably disposed over output shaft 30.

Adapter module 20 also has two clutches: a launch clutch 46 and a regen clutch 48.

Launch clutch 46 is coaxial with first gear 42 and selectively connects first gear 42 to counter shaft 32. First gear 42 is accordingly rotationally aligned with counter shaft 32. Regen clutch 48 is coaxial with second gear 44 and selectively drivingly connects second gear 44 with output shaft 30. Second gear 44 is accordingly rotationally aligned with output shaft 30. Clutches 46 and 48 do not have to be coaxial with their respective gears, as might be the case if intermediate elements are employed. An important function of launch clutch 46 is that it provides a selective driving connection between countershaft 32 and HLA system input shaft 38. An important function of regen clutch 48 is that it provides a selective driving connection between output shaft 30 and the HLA system input shaft 38.

Launch clutch 46 is shown in the figures as being a slider or dog-tooth type clutch. Such a clutch has the benefit of being self contained, requiring little energy to operate, and permitting no slippage when engaged. Launch clutch 46 can be controlled by any mechanism suitable for axially displacing a clutch sleeve. Such mechanisms are well known in the art of transmissions, and include pneumatically, hydraulically and electrically actuated shift forks. Schemes for direct displacement through electromagnetic means are also known in the art.

Regen clutch 48 is shown as a plate-type clutch, typical of those found in torque converter type automatic transmissions. Such clutches have the advantage of being able to permit engagement while there is a relative speed difference between the parts being engaged by the clutch. Additionally, plate clutches more easily enable declutching or releasing than typical sliding dog tooth clutches.

HLA system 14 includes a pump/motor unit 50 and both a high pressure accumulator 52 and a reservoir or low pressure accumulator 54. The HLA system functions as described in U.S. Pat. No. 7,082,757. In an HLA "charging" or "regeneration" mode, torque is applied to input shaft 38 of both HLA system 14 and pump/motor unit 50 with pump/motor unit 50 operating in a pump mode. In the pump mode, pump/motor unit 50 draws hydraulic fluid from low pressure accumulator 54 and forces it into high pressure accumulator 52 where the fluid is retained under significant pressure. In a "discharging" or "driving" mode of HLA system 14, pump/motor unit 50 operates in a motor mode. In the motor mode, pressurized fluid from high pressure accumulator 52 acts on pump/motor unit 50 to induce a torque on input shaft 38 and causing shaft 38 to rotate. Fluid exiting pump/motor unit 50 enters low pressure accumulator 54. Torque is transferred between HLA system 14 and adapter module 20 by intermediate propeller shaft 16.

A description of the invention operation follows. In a first, or launch condition, a vehicle employing the inventive drivetrain is at a complete stop with the vehicle engine idling, master clutch 22 disengaged, range box 26 in an appropriate launch mode, and high pressure accumulator 52 fully charged. A first gear ratio clutch within transmission front box 24 is engaged. Launch clutch 46 is engaged, rotatively fixing transmission counter shaft 32 to HLA input shaft 38. Regen clutch 48 is disengaged, allowing gear 44 to rotate freely on output shaft 30. Pump/motor 50 is operated in its motor mode, communicating torque to counter shaft 32 and through the transmission gear set of the first gear ratio to output shaft 30, through range box 26 and driveshaft 18 to the vehicle axle (not shown), starting the vehicle in motion. It is appreciated that transmission input shaft 28 is back-driven through a gear set between the input shaft and countershaft, or headset 56, by the rotation of countershaft 32. When input shaft 28 reaches approximately the rotational speed of the crankshaft of the idling engine, master clutch 22 can be engaged, and the source of driving power transitioned from HLA system 14 to the vehicle engine. Launch clutch 46 can then be disengaged.

It should be appreciated that this sequence can be altered. For example, instead of having the engine idling, the engine could be completely stopped. With master clutch 22 engaged, launch clutch 46 engaged and transmission front box 24 in neutral, the engine would be started by torque from HLA system 14 passing through the countershaft and transmitted to the engine through headset 56. Master clutch 22 and launch clutch 46 would be each disengaged, a start gear selected in front box 28, and the vehicle launched by engaging master clutch 22. Depending on the torque capabilities of HLA system 14, it may be possible to simultaneously launch the vehicle and start the motor. With master clutch 22 engage, launch clutch 46 engaged and transmission front box 24 in a selected launch gear, the engine would be started as the vehicle starts to roll under the power of the HLA system. Once the engine is at a self-sustaining speed, launch clutch 46 is disengaged. Yet alternatively, the vehicle could be launched using the HLA alone, and the engine started by engaging master clutch 22 when the vehicle is at a predetermined speed. Launch clutch 46 would be disengaged before engaging master clutch 22.

In an alternative launch mode of operation, with the vehicle at a stop, the engine idling, and high pressure accumulator 52 fully charged, master clutch 22 is disengaged, launch clutch 46 is disengaged, and regen clutch 48 is engaged. A gear set within each of transmission front box 24 and range box 26 is selected and engaged. HLA system 14 is used to launch the vehicle. Output shaft 30, through its selected gear set, back drives countershaft 32 which in turn back drives transmission input shaft 28. When input shaft 28 is rotating at about engine idle speed, master clutch 22 is engaged while regen clutch 48 is disengaged, enabling a smooth shift from HLA driving torque to engine driving torque.

To enable operation of HLA system 14 in a regeneration mode, launch clutch 46 is disengaged, regen clutch 48 is disengaged, master clutch 22 can be either engaged or disengaged, the front box 24 and range box 26 each have an appropriate gear engaged, and the vehicle is moving at or below a predetermined speed. Pump/motor unit 50 is placed in the pump mode, and regen clutch 48 is engaged to recharge the high pressure accumulator. Rotation of output shaft 36, resulting from rotation of the vehicle wheels, through range box 26, drives output shaft 30 which rotates second gear 44 which, through first gear 42, causes HLA system input shaft 38 to rotate, causing motor pump 50 to draw fluid from low pressure accumulator, and force it into high pressure accumulator 52 under high pressure. Such recharging can be executed responsive to vehicle system commands to slow the vehicle, providing regenerative braking. The kinetic energy associated with the inertia of the vehicle is transformed into the potential energy associated with the pressurized hydraulic fluid in the high pressure accumulator.

Placing adapter module 20 between front box 24 and auxiliary section 26 of transmission 12 beneficially enables MLA system 14 to be used to provide hydraulic assist in several different drive ratios. It is anticipated that for certain applications, auxiliary section 26 would enable the anticipated range of speed of countershaft 32 to remain within the operating speed range of the HLA pump/motor unit 50. In such cases, power from HLA system 14 would be available over the entire operational range of the vehicle.

Figure 3:
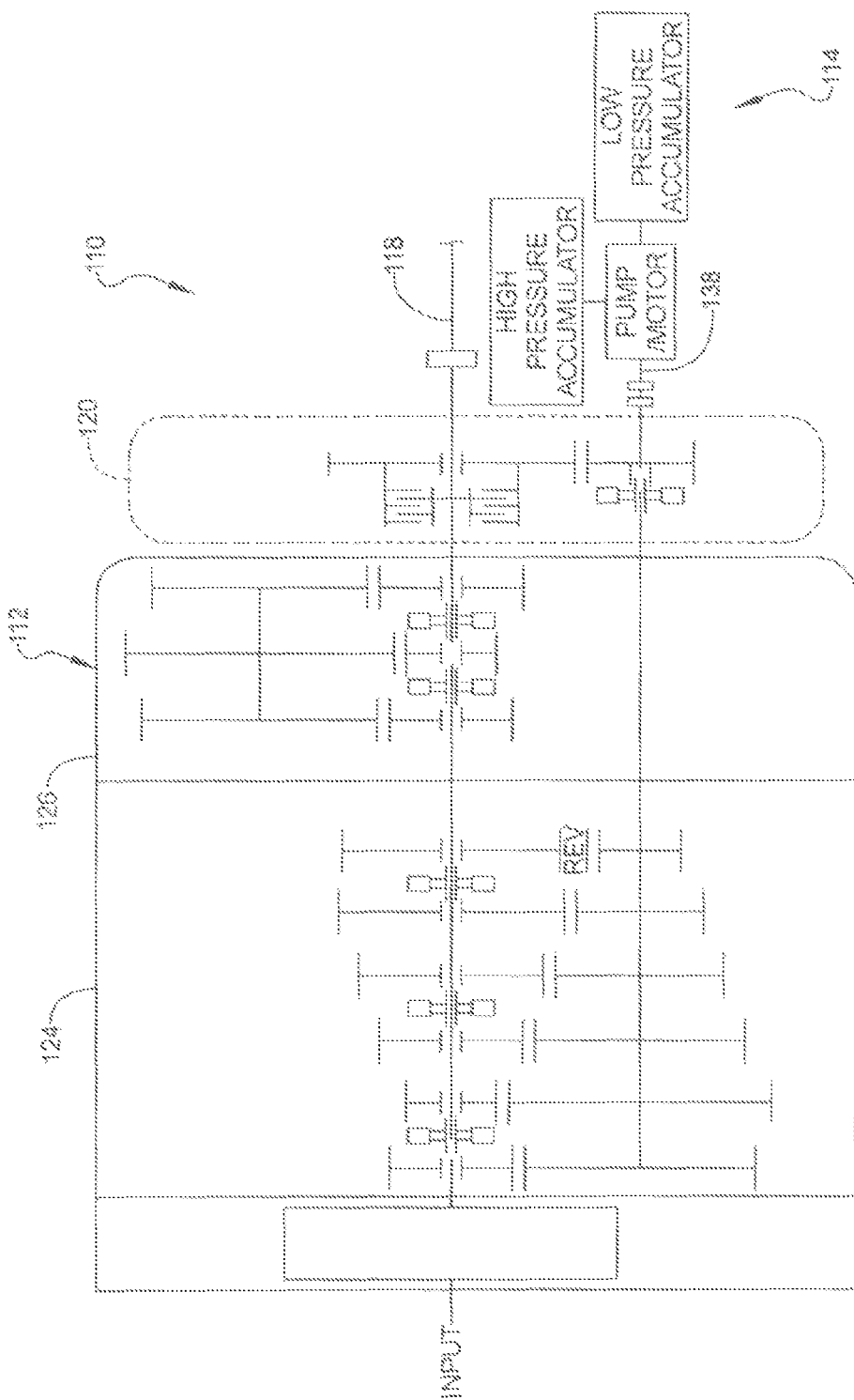
FIG. 3 is a schematic view of a first alternative embodiment of the invention.

FIG. 3 shows an alternative drivetrain 110 in which a transmission 112 has the more conventional arrangement of an auxiliary section or box 126 fixed directly to an end of a front box 124. An adapter module 120 is mounted to an end of auxiliary box 126 opposite front box 124. The launch modes and regen or recharge modes of operation would be essentially the same as described above for the embodiment of FIG. 2, but an HLA system 114 would only be available at a low end of the vehicle's range of operating speeds because of the fixed ratio relationship between the rotational speed of an HLA input shaft 138 and a propeller shaft 118 connecting to the axle.

Figure 4:
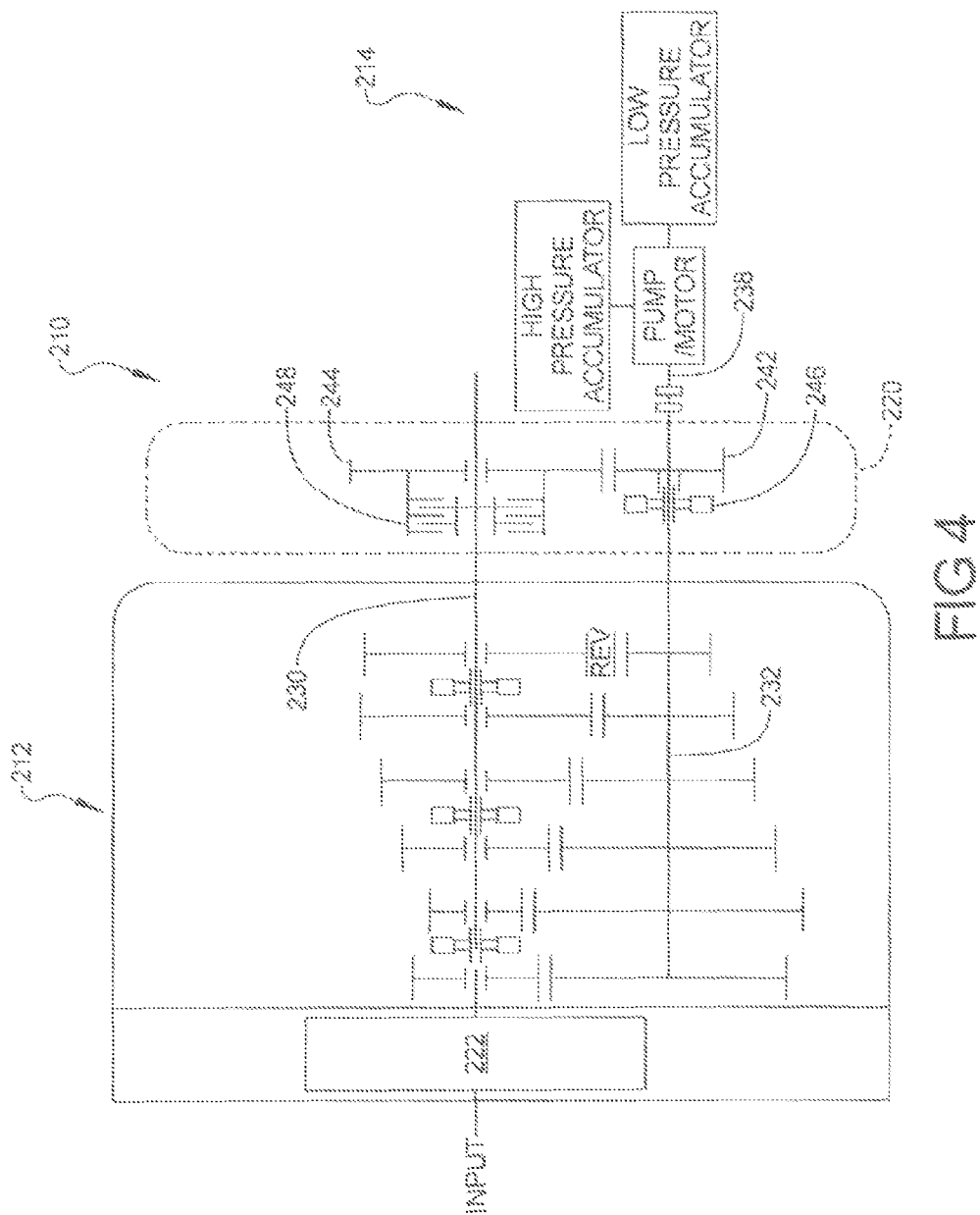
FIG. 4 is a schematic view of a second alternative embodiment of the invention.

FIG. 4 shows an alternative drivetrain 210 for a transmission 212 not having an auxiliary section. Such arrangements are typical in light and medium duty vehicle applications. Adapter module 220 is connected to an end of transmission 212 opposite a master clutch 222. A first gear 242 and a launch clutch 246 and HLA input shaft 238 are axially aligned with a countershaft 232. A second gear 244 and regen clutch 248 are disposed over output shaft 230. As with the embodiment of FIG. 3, HLA system 214 is only available at the low end of the vehicle's operating speed range because of the fixed ratio relationship between the rotational speed of HLA input shaft 238 and the output shaft 230 which is drivingly connected to the axle.

Figure 5:
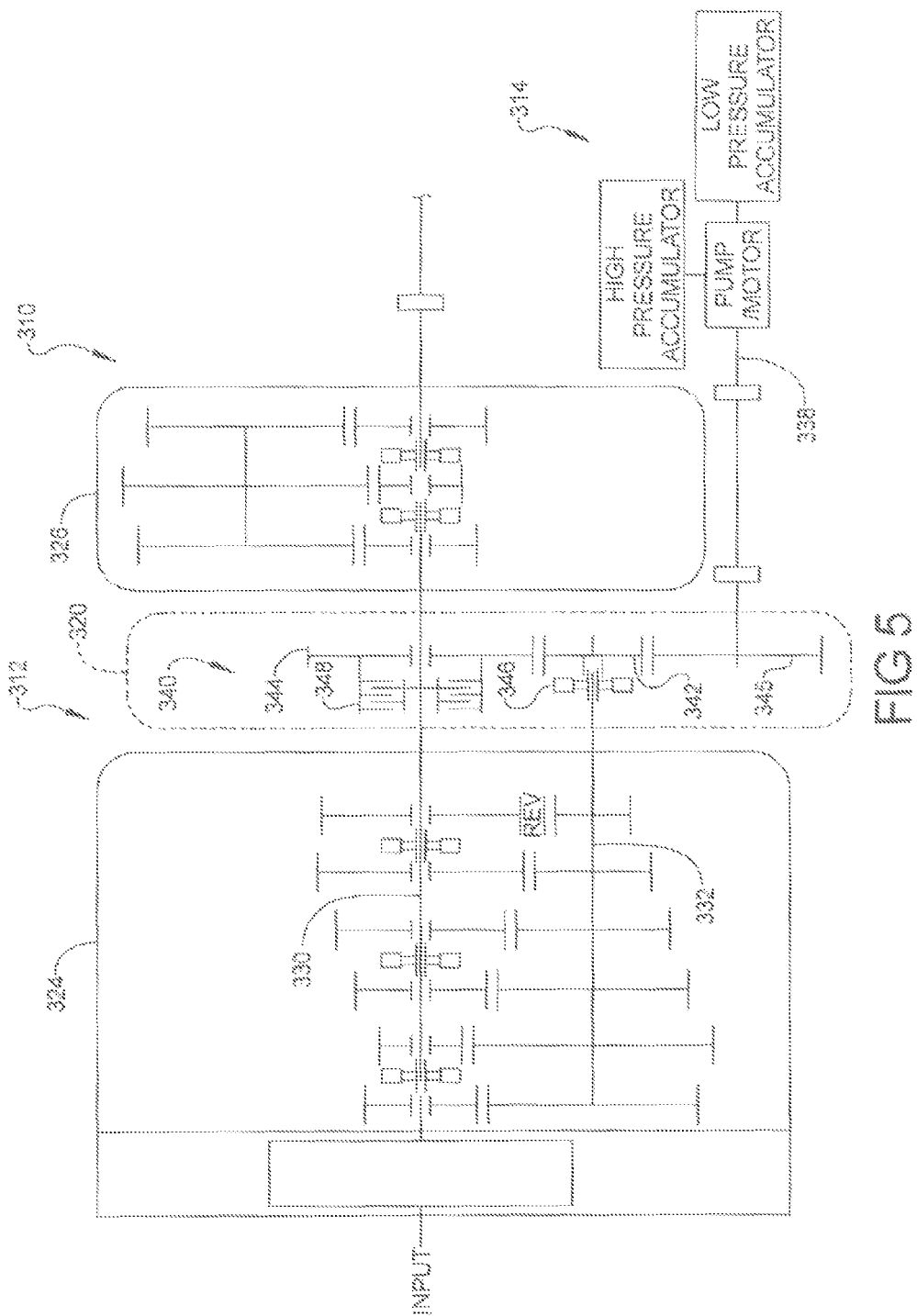
FIG. 5 is a schematic view of a third alternative embodiment of the invention.

FIG. 5 shows a drivetrain 310 nearly the same as that of FIG. 2, with an adapter module 320 disposed between a front box 324 and an auxiliary section 326 of transmission 312. A significant change relative to the embodiment of FIG. 2 is that the embodiment of FIG. 5 does not have HLA input shaft 338 axially aligned with countershaft 332. Instead, adapter module 320 has a third gear 345 in its adapter module gear set 340. First gear 342 is in axial alignment with countershaft 332. Launch clutch 346 selectively engages first gear 342 with countershaft 332. Second gear 344 is disposed over output shaft 330 of front box 324, with regen clutch 348 selectively rotatively fixing second gear 344 to output shaft 330. Third gear 345, drivingly meshed with first gear 342, is rotatively fixed to input shaft 338 of HLA system 314.

Figure 6:
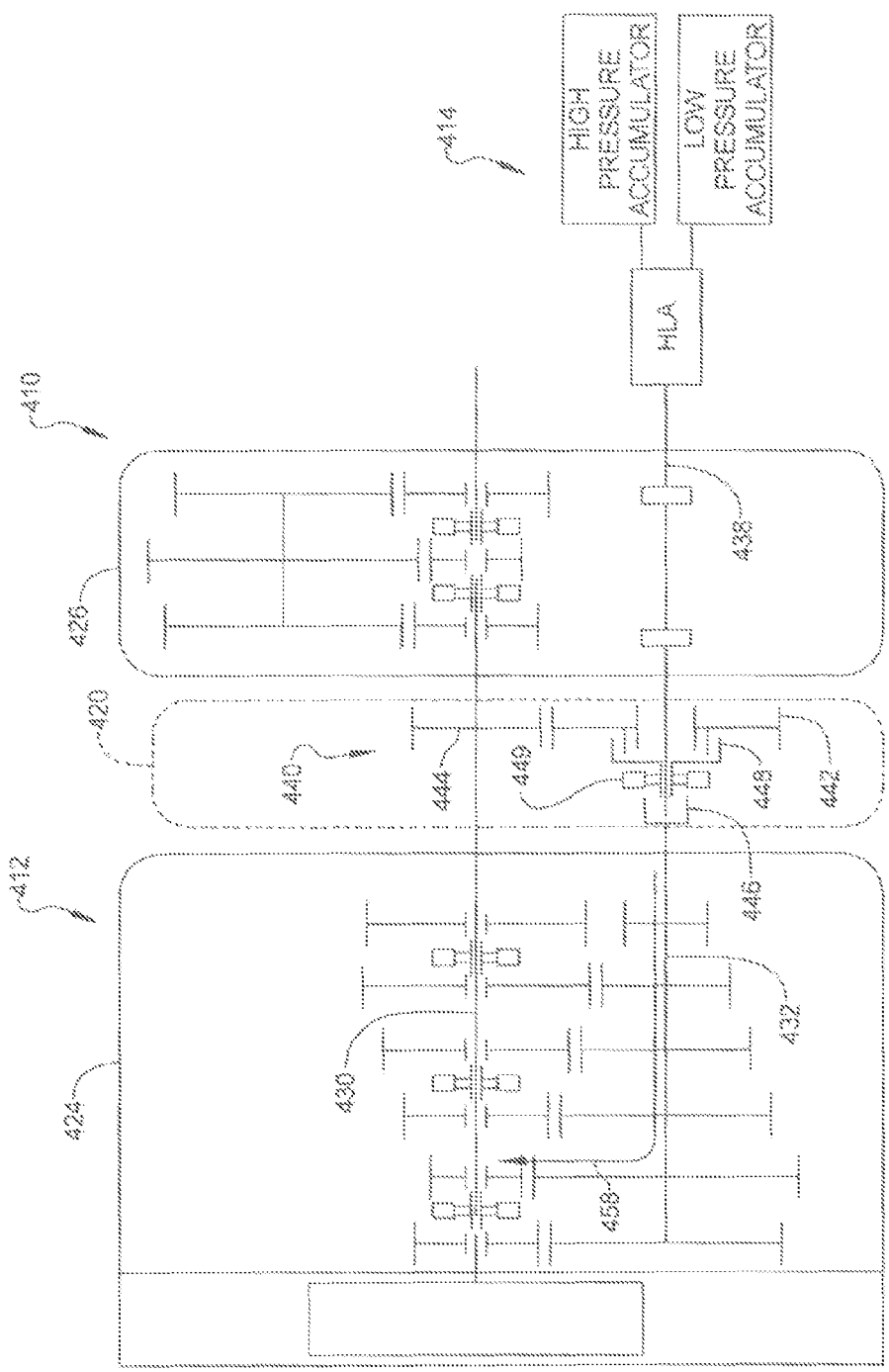
FIG. 6 is a schematic view of a fourth alternative embodiment of the invention.

FIG. 6 also shows a drivetrain 410 nearly the same as that of FIG. 2, with an adapter module 420 disposed between a front box 424 and an auxiliary section 426 of transmission 412. A significant change relative to the embodiment of FIG. 2 is that the embodiment of FIG. 6 does not have a launch clutch in axial alignment with output shaft 430. Instead, a two-way clutch mechanism 449 employed to alternatively provide the launch and regen functions is in axial alignment with countershaft 432. Also, first gear 442 rotates freely relative to input shaft 438 unless mechanism 449 engages clutch 448, instead of being fixed relative thereto as in the embodiment of FIG. 2. Second gear 444 is accordingly fixed relative to output shaft 430, as distinguished from the embodiment of FIG. 2 which has the second gear rotatably mounted on the output shaft.

Clutching mechanism 449 selectively engages regen clutch 448 to rotatably couple first gear 442 to HLA system input shaft 438 in a regen mode. Torque is transferred between HLA system 414 and output shaft 430 by gear set 440. Alternatively, clutching mechanism 449 selectively engages launch clutch 446 to rotatably couple HLA system input shaft 438 with a countershaft 432 in a launch mode. Arrow 458 illustrates one possible torque path in the launch mode. No torque is transmitted through gear set 440.

FIG. 7 shows a drivetrain 510 similar to that of FIG. 4, with an adapter module 520 adjacent to a transmission 512 having no auxiliary section. A significant change relative to the embodiment of FIG. 4 is that an electric hybrid system 560 has been substituted for the HLA system. Hybrid system 560 serves as an alternative means of converting mechanical kinetic energy to potential energy. Another difference is that regen clutch 548 is a non-synchronized dog-tooth clutch, like launch clutch 546. Another less significant difference is that adapter module 520 has three gears like the adapter module of FIG. 5.

Hybrid system 560 includes an electric motor/generator 562 in place of a hydraulic pump/motor, and a battery 564 in place of a high pressure accumulator. Hybrid system 560 additionally includes a power electronics module 566 which may incorporate elements, by way of example, a voltage transformer, and an inverter. Power electronics module 566 can be comprised of integrated elements, or separate, discrete elements. Motor/generator 562 is scalable depending on system design requirements. An anticipated power range for the motor/generator for the anticipated applications is 30 kW to 100 kW. Packaging design will accommodate the packaging of a range of motor/generator sizes. Motor/generator capacities can potentially be varied with the length of the motor/generator. Battery 564 can also be scaled to accommodate anticipated system demands. Larger batteries incorporating additional cells may be employed. Or, alternatively, a plurality of identical batteries may be employed to increase energy storage capacity as may be desired.

Each of the embodiments of FIGS. 1-7 would require systems controls to operate the transmission and hybrid system, whether hydraulic or electronic, in a coordinated fashion. FIG. 7 shows discrete transmission and hybrid electronic control units ("ECU" or "ECUs") 568 and 570 respectively. It should be appreciated that transmission and hybrid ECUs 568 and 570 could be integrated into a single ECU. Transmission ECU 568 is electronically connected to transmission and adapter module controllers 572 and 574 respectively. Controllers include mechanisms for shifting the transmission and the adapter module to select desired gear modes. Such mechanisms are well known in the art and can include any of electric or hydraulic or pneumatic actuating mechanisms or any combination thereof. The connections can be by wire, or can by any known wireless means such as Bluetooth®. Such connections provide a means of transmitting control signals from ECU 568 to controllers 572 and 574.

By employing an electric hybrid system 560, driveline 510 beneficially eliminates the need for a synchronizing clutch within adapter module 520. Electric motor/generator 562 can be speed controlled with sufficient accuracy to provide the necessary low speed differential between gear 544 and output shaft 530 to enable engagement of dog clutch 548 without any mechanical synchronization to speeding up or slowing down the supplemental power source, in this case motor/generator 562. Driveline systems employing hydraulic pump/motors preferably employ mechanical synchronization means such as plate clutches or synchronizer type dog clutches to bring the rotating speeds of the rotating parts into synchronization because the response time of a pump/motor to speed control commands is significantly greater that that of an electric motor.

As with the hydraulic system, alternative embodiments of the electric hybrid system are anticipated. Examples of alternative configurations are shown in FIGS. 8 through 10.

We claim:

1. A drivetrain for a motor vehicle comprising:

an automated mechanical transmission having an a transmission input shaft and a transmission output shaft and a transmission countershaft and a first gear set disposed between the input shaft and the countershaft and at least three selectively engageable gear sets disposed between the countershaft and the output shaft and a discrete transmission enclosure extending axially and substantially enclosing the input shaft, the countershaft and the output shaft; and an alternative power source including a motor and an energy storage unit;

an auxiliary section disposed between the transmission output shaft and an auxiliary section output shaft and including the auxiliary section output shalt being in axial alignment with the transmission output shalt;

an auxiliary counter shalt radially offset from the output shaft;

a first auxiliary gear set disposed between the transmission output shalt and the auxiliary counter shaft;

a second auxiliary gear set disposed between the auxiliary counter shall and the auxiliary section output shaft;

an auxiliary section clutch selectively drivingly connecting the transmission output shaft with the auxiliary section output shaft through one of the first and second auxiliary gear sets; and a discrete auxiliary enclosure extending axially and substantially enclosing the first clutch and the second clutch;

an adapter module operably disposed between the automated mechanical transmission and the motor and including an adapter gear set including a first adapter gear rotationally aligned with the countershaft and in mesh with a second adapter gear rotationally aligned with the output shaft, providing driving connections between the motor and one of the transmission output shaft and the auxiliary section output shaft;

a first clutch selectively drivingly connecting the motor input shalt to the countershaft; and a second clutch selectively drivingly connecting the adapter output shaft to the motor input shaft through the adapter gear set;

a discrete adapter enclosure extending axially and substantially enclosing the first clutch and the second clutch, thereby enabling the use of a conventional transmission as part of at hybrid powertrain;

wherein the motor is radially offset from the transmission countershaft.

2. The drivetrain as claimed in claim 1 wherein the second clutch is a multiplate clutch enabling a transmission of torque between the associated gear and shaft while there is slippage across the clutch.

3. The drivetrain as claimed in claim 1 wherein each of the first and second clutches is a non-synchronized dog-toothed clutch.

* * * * *